No. 723,291. PATENTED MAR. 24, 1903.
J. MAITLAND.
STRENGTH TESTING DEVICE.
APPLICATION FILED DEC. 21, 1901.
NO MODEL. 5 SHEETS—SHEET 1.
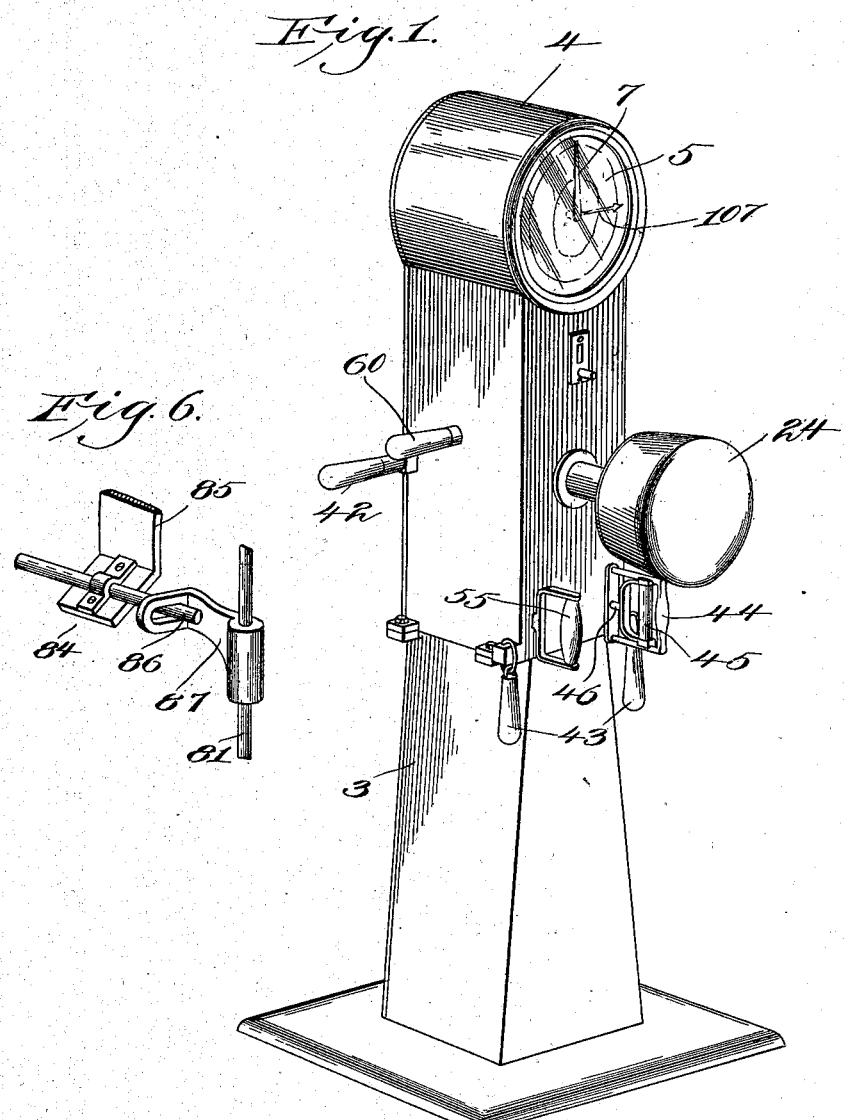
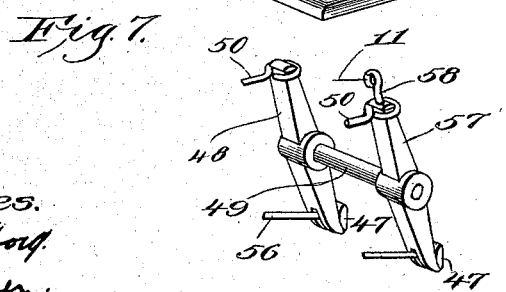

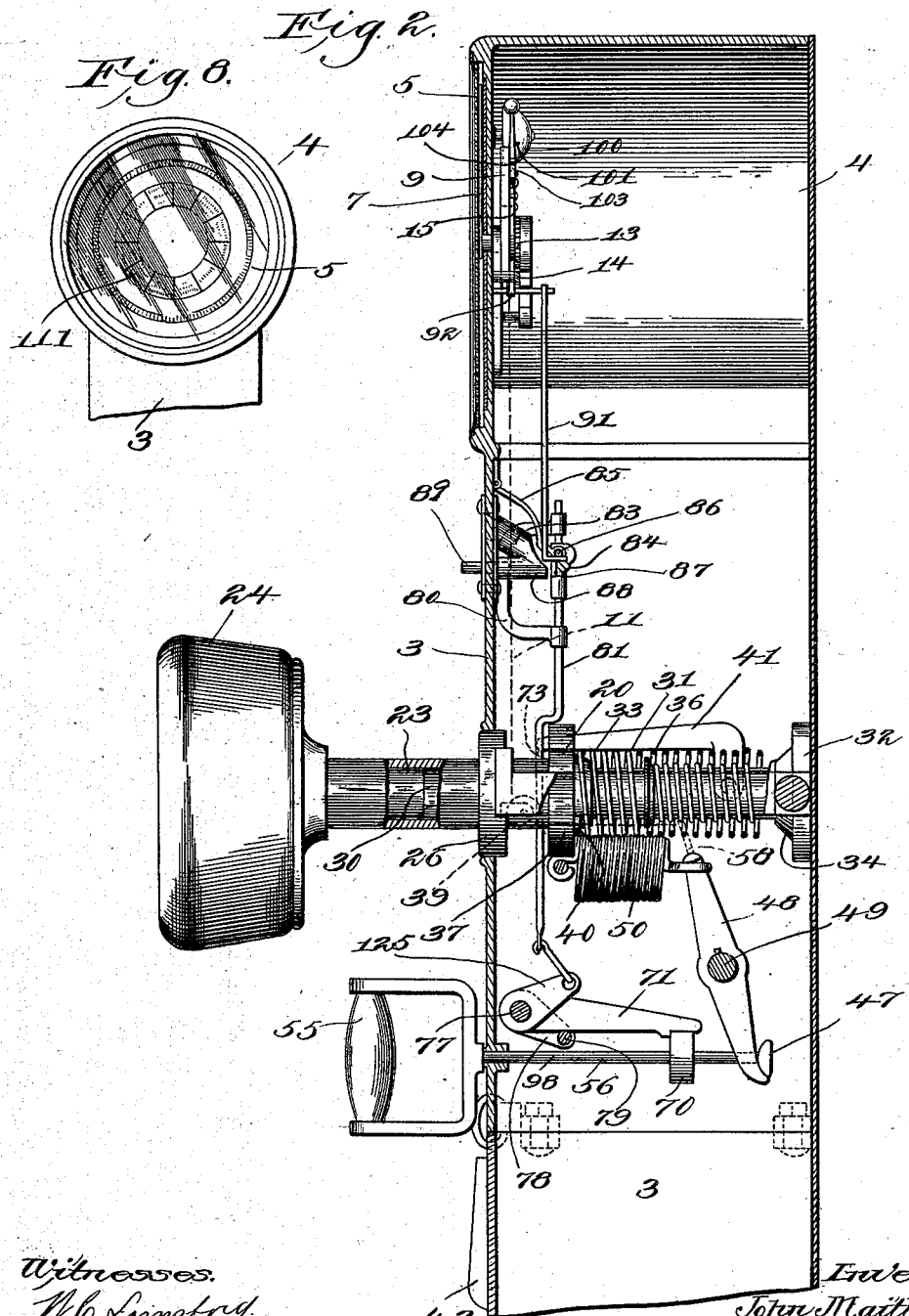

No. 723,291. PATENTED MAR. 24, 1903.
J. MAITLAND.
STRENGTH TESTING DEVICE.
APPLICATION FILED DEC. 21, 1901.
NO MODEL. 5 SHEETS—SHEET 3.

No. 723,291. PATENTED MAR. 24, 1903.
J. MAITLAND.
STRENGTH TESTING DEVICE.
APPLICATION FILED DEC. 21, 1901.
NO MODEL. 5 SHEETS—SHEET 4.
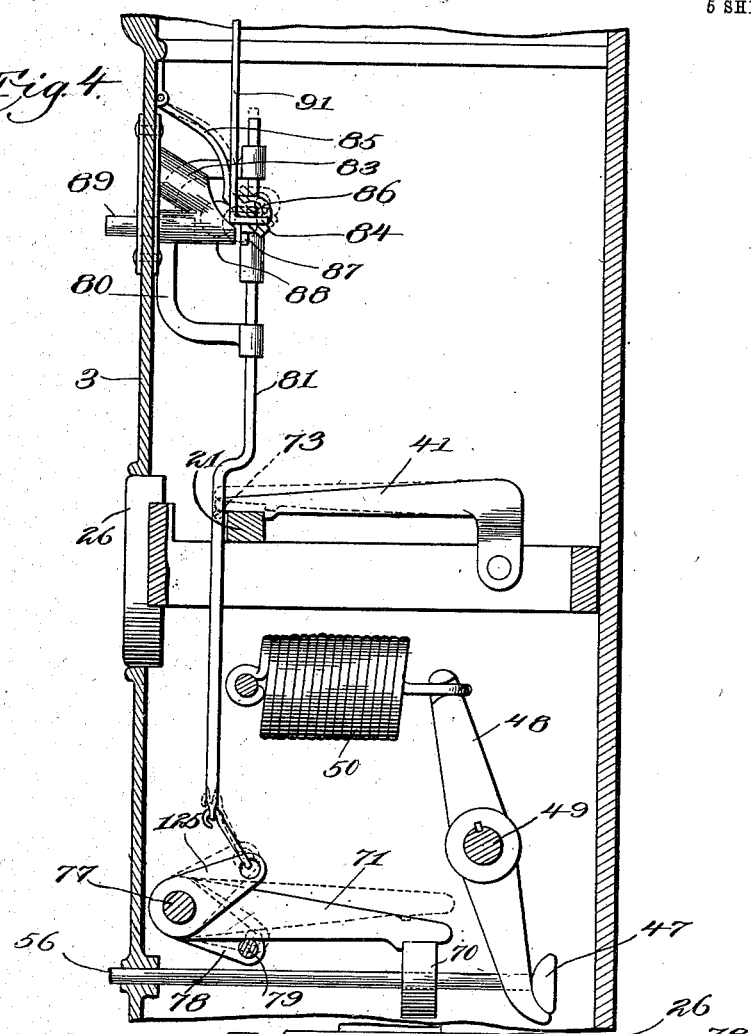
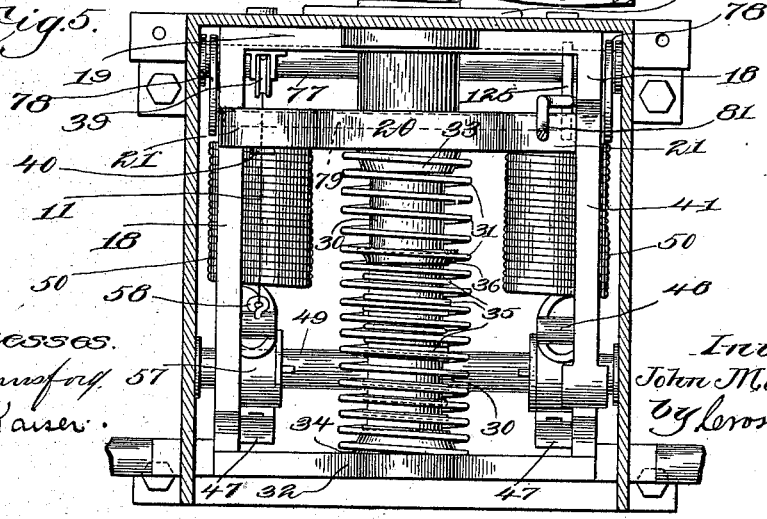

No. 723,291. PATENTED MAR. 24, 1903.
J. MAITLAND.
STRENGTH TESTING DEVICE.
APPLICATION FILED DEC. 21, 1901.
NO MODEL. 5 SHEETS—SHEET 5.
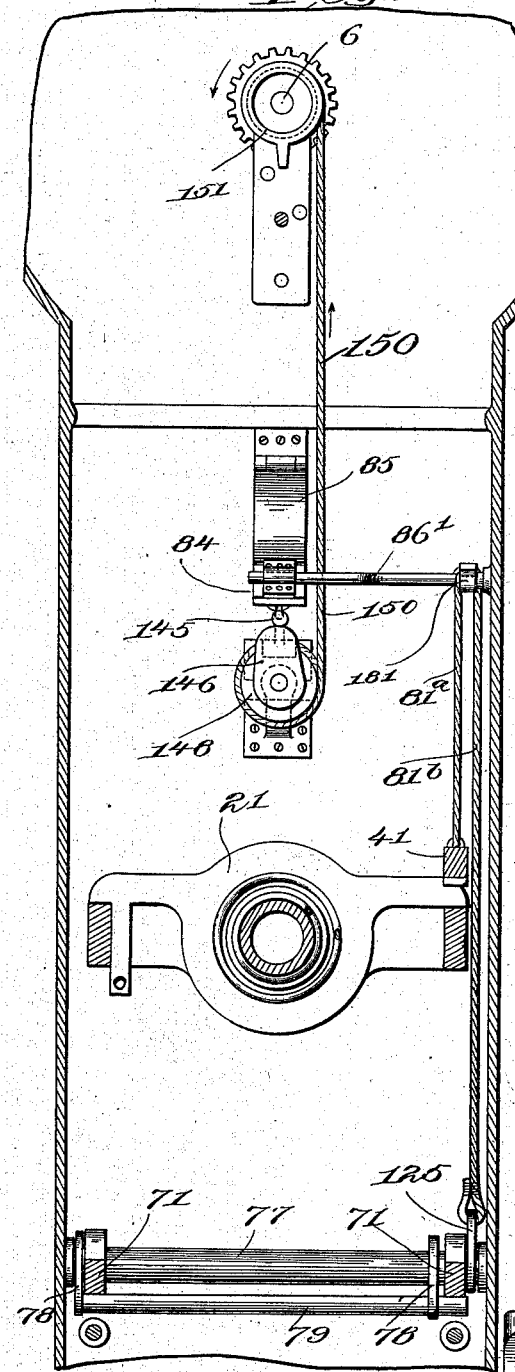
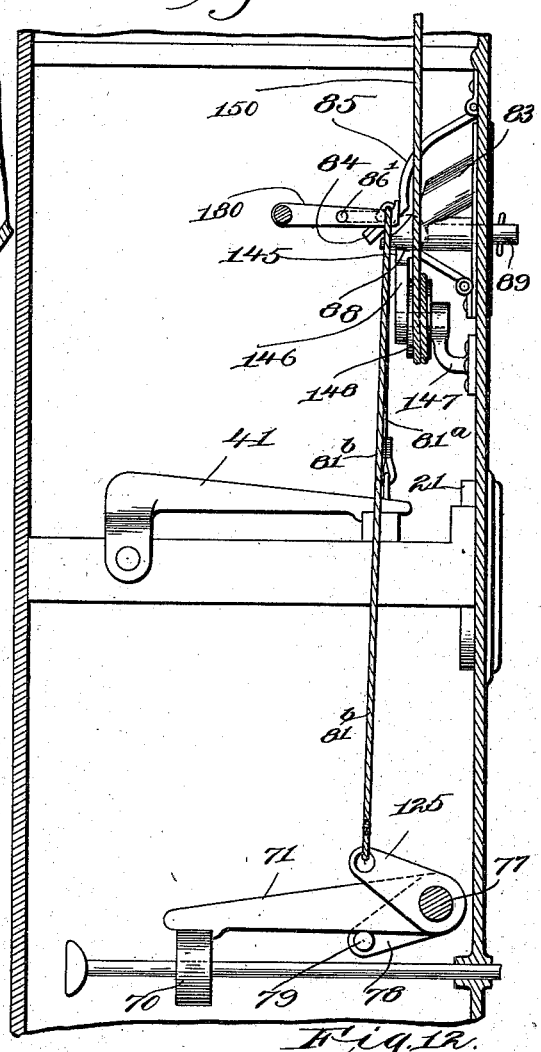
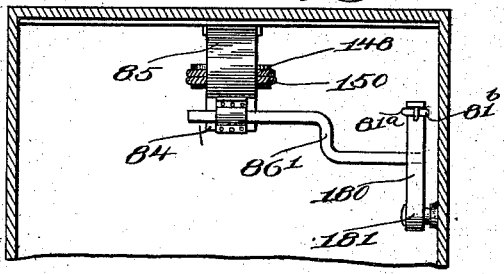
Witnesses.
W. C. Lunsford.
Adolph C. Kaiser.
Inventor.
John Maitland,
by Dooley Gregory.
Attys.

UNITED STATES PATENT OFFICE.

JOHN MAITLAND, OF SWAMPSCOTT, MASSACHUSETTS.

STRENGTH-TESTING DEVICE.

SPECIFICATION forming part of Letters Patent No. 723,291, dated March 24, 1903.

Application filed December 21, 1901. Serial No. 86,731. (No model.)

*To all whom it may concern:*

Be it known that I, JOHN MAITLAND, a citizen of the United States, residing at Swampscott, in the county of Essex and State of Massachusetts, have invented an Improvement in Strength-Testing Devices, of which the following description, in connection with the accompanying drawings, is a specification, like numerals on the drawings representing like parts.

This invention has for its object the production of an apparatus for testing and registering the strength of an individual.

The device is so constructed that various tests may be made thereon—such, for instance, as the force of a blow struck upon a head or plunger, the strength of the grip, the amount that a person can pull with one arm, and the amount that a person can pull with both arms when either his back or his chest is against the head or plunger. The devices for making these various tests of the strength may be independently operated; but they are all so related to each other that the force expended in making each of the tests is recorded by a single recording device. I have also provided a suitable locking mechanism for locking the testing devices in their inoperative position, and manually-operated means are provided for unlocking any one of the testing devices when a test is desired to be made.

The locking mechanism I prefer to employ is a coin-controlled locking device and is so constructed that after one test has been made the testing device operated is locked again, as well as all the other testing devices, so that if a second test is to be made the testing device must be unlocked by the insertion of a second coin.

Referring to the drawings, Figure 1 is a perspective view of my improved strength-testing device. Fig. 2 is a vertical central section of the upper portion of said apparatus. Fig. 3 is a back elevation of the device with the back plate removed. Fig. 4 is an enlarged detail of the locking mechanism for the testing devices. Fig. 5 is a view on the line *x x*, Fig. 3. Fig. 6 is a detail of the lock-releasing means. Figs. 7 and 9 are details hereinafter referred to. Fig. 8 is a view of the dial. Figs. 10, 11, 12, and 13 are views showing a slightly-modified form of releasing device.

The various testing devices and the registering device are supported in a suitable casing 3, which may be of any suitable shape, it being shown as having at its upper end a head 4, in the face of which is a suitable graduated dial 5, which will preferably be marked to indicate pounds.

The registering mechanism comprises a suitable shaft or arbor 6, supported in any convenient way on the face of the head, the said shaft or arbor projecting through the dial and having a pointer 7 mounted on the end thereof in such a position that as the shaft is turned the pointer will move over the face of the dial to indicate the force in pounds expended in thus moving the shaft to any particular position. The shaft has connected thereto a gear or pinion 8, which meshes with a segmental rack 9, pivoted, as at 10, to the front of the head. The rack 9 is moved downwardly or in a direction to cause the arbor 6 to rotate forwardly by means of a suitable flexible connection, shown as a cord or chain 11, which is so connected as to be operated by the various strength-testing devices hereinafter described, it being obvious that the distance through which the pointer 7 is moved will be proportionate to the distance that the rack 9 is turned by the flexible connection 11.

After any test has been made it is desirable that the pointer should remain in the position to which it has been rotated, so that the exact number of pounds force expended in making the test can be readily observed. As one convenient way of thus locking or maintaining the pointer in its indicating position I have provided the hub of the rack 9 with a ratchet 13, with which engages a suitable spring-pressed pawl 14, the pawl and ratchet being so constructed that the nose of the pawl will click over the ratchet-teeth as the rack 9 is swung downward, but will engage the said ratchet-teeth and prevent the rack from returning to the full-line position under the influence of the spring 15, which is so constructed as to normally tend to bring the rack into said full-line position. A hand-lever 16 is pivoted in any suitable way to the casing and is connected at one end to the pawl 14, the other end of said lever projecting outwardly through the head, as seen in Fig. 3.

When it is desired to release the pointer 7, the lever 16 will be moved in the direction of the arrow, thereby disengaging the pawl 14 from the ratchet 13 to enable the spring 15 to return the rack and pointer 7 to their initial positions.

The various strength-testing devices will now be described.

A suitable frame 19 is carried by the interior of the casing, the said frame having as part of its construction two parallel side rails or guideways 18, upon which is mounted to slide a cross-bar 20, the said cross-bar being shown as having a central portion in the form of a collar and extended side wings 21, which extend over and rest upon the tracks or guideways 18. The collar portion of the cross-bar 20 has connected thereto a tubular plunger 23, which projects through a collar 26 in the front of the casing 3, forming part of the frame 19, and carries at its end a padded head 24. The frame 19 has rigidly secured to the back portion thereof in any suitable way a cylindrical projection 30, which extends toward the front of the machine and passes through the collar 20 and telescopes into the plunger 23. This projection 30 fits the interior of the plunger 23 and acts as a guide therefor. A coiled spring 31 surrounds the projection 30 and engages at one end the back portion 32 of the frame 19, the other end of the spring engaging the back side of the collar 20, and for the purpose of properly centering the spring I preferably provide the collar 20 with a conical seat 33, which sets into the end of the coiled spring, and the portion 32 of the frame is provided with a similar conical seat 34, which serves to center the spring. A second spring 35 is also employed, said spring being situated on the interior of the main spring 31 and fitting tightly the cylindrical projection or guideway 30, one end of said supplemental spring 35 engaging the seat 34 and the other end engaging a collar 36, which is slidably mounted upon the guide 30. From this description it will be seen that whenever the head 24 is pushed inward either by means of a blow struck thereon or by means of constant pressure applied thereto the collar 20 will be moved inward against the action of the main spring 31, and as the inward movement of the plunger continues the seat 33 will strike the sliding collar 36, when the further inward movement of the plunger is against the action of both the springs 31 and 33. The cross-bar or collar 20 is connected to the flexible connection 11 in such a way that any inward movement of the said cross-bar draws upon the flexible connection 11, and thereby turns the rack 19, as I have above described.

One convenient way of connecting the cord 11 to the cross-bar is to provide the cross-bar with a depending arm 37, having an eye 38, through which the flexible connection 11 passes, the said cord passing around a direction-pulley 39, secured in any usual way to the frame 19.

The flexible connection 11 has attached thereto a button or stop 40, which engages the back side of the arm 37, from which it will be seen that as the plunger 23 is moved inward the flexible connection 11 will be drawn downwardly and the rack 9 oscillated to cause the pointer 7 to be turned.

The relation between the springs 31 and 35 and the graduation-marks upon the dial will be such, of course, that the distance that the said springs are compressed, by means of a certain definite force, will be such as to cause the pointer to indicate upon the dial this same amount of force.

A suitable locking-pawl 41, which is pivoted to the frame 19, engages one of the wings or arms 21 of the collar or cross-bar 20 and serves to lock the said collar, and consequently the plunger, in its initial or outward position.

I have provided suitable manually-controlled releasing devices, which I will presently describe, for raising the pawl 41 from the full-line position to the dotted-line position, Fig. 4, to thereby release the cross-bar 20 and allow the plunger 23 to be moved inward when it is desired to make a test.

The mechanism I have thus far described is for registering the force of a blow struck by the fist or otherwise upon the padded head 24, and the manner in which the force expended by the blow in moving the plunger inward is registered will be apparent without further description.

Referring to Figs. 1 and 3, it will be seen that suitable handholds 42 are secured to the casing on either side thereof, the said handholds preferably forming part of and being rigid with the back member 32 of the frame 19.

If a person desires to test the strength of his arms and chest, he will grasp the handholds 42 and place his chest against the pad 24, when by drawing himself toward the casing the strength of his arms and chest or the force of the "hug," as it may be termed, will be recorded.

If it is desired to test the strength of the arms, shoulders, and back, the operator will place his back against the head 24 and will then grasp hand-grips 43, which are attached in any suitable way to the casing. By pulling forwardly on the hand-grips 43 the plunger 25 will of course be moved inwardly a distance corresponding to the strength expended in making the test and the recording devices operated as above described to indicate the force thus expended.

I have combined with the features above described means whereby the strength of a person's grip or the amount that he can pull with one arm may be recorded.

The grip-testing device comprises a suitable frame or handle 44, which is fixed rigidly to the front of casing 3 and which receives for sliding movement a hand-grip 45, the said hand-grip having a stem 46 connected thereto, which projects into the casing 3 and is connected to the lower end of the lever 57. The other end of the lever has connected thereto one end of a spring 50, which is rigidly mounted upon a rock-shaft 49, which in turn is mounted in any suitable way in the casing. The other end of said spring is made fast to the casing in any suitable way.

I have illustrated in Fig. 7 the lever 57 as having at its upper end a projection 58, provided with a suitable eye to which the end of the flexible connection 11 is secured. In this embodiment of my invention I have illustrated the end of the stem 46 as passing through the slotted lower end of the lever 57 and as having fast thereon a suitable head 47, which engages the back side of said lever, this construction being preferable because it makes a pivotal connection between the stem 56 and the lever which has comparatively little friction.

In making the gripping test the person will place the palm of his hand over the handle 44 and place his fingers around the handle 45, when by closing the fingers the handle 45 will be drawn outwardly and the lever 57 rocked, to thereby draw upon the end of the flexible connection 11 and turn the segmental rack 9, which in turn rotates the pointer, as above described, the flexible connection during such operation being drawn through the eye 38, as will be obvious, without in any way affecting the collar 20.

The pull-testing device comprises a handle 55 on the exterior of the casing and having its stem 56 projecting into the interior of the casing and connected to the lower end of an operating-lever 48, which is also fast upon the rock-shaft 49. The upper end of said lever 48 has connected thereto any suitable spring 50, as described with reference to the lever 57, while the lower end of said lever 48 is connected to the stem 56 in the same way as the lower end of the corresponding lever 57 is connected to its stem 46—that is, the lower end of said lever is slotted and the end of the stem 56 projects through the slot and is provided with a head 47, engaging the back side of said lever.

In making the pulling test the person will grasp the handle 55 with one hand and brace himself by placing the other hand against the fixed handhold 60 on the exterior of the case, when by pulling upon the handle 55 the lever 48 and the rock-shaft 49 will be rocked, thereby turning the lever 57, and consequently drawing upon the flexible connection 11, as above described.

The stems 56 and 46 of the pulling and grip testing devices each have a collar 70 thereon, with which coöperates a locking-pawl 71, pivoted to the casing. These locking-pawls when in their normal position, as shown in Fig. 2 and full lines, Fig. 4, serve to lock the handles 45 and 55 from being operated; but when either one of said pawls is raised to the dotted-line position, Fig. 4, it will be obvious that the corresponding testing device is free to be manipulated.

The releasing means for the various pawls 41 and 71 which I have chosen to illustrate is a manually-controlled releasing means and also necessitates the use of a coin for its operation. The releasing device is so constructed that whenever it is operated through the medium of a coin all of the pawls are simultaneously released, whereby all of the various testing mechanisms are unlocked ready for use.

In order to prevent more than one test being made by the insertion of a single coin, I have so constructed my releasing mechanism that as soon as any one test is partially made all of the pawls except that operating as the lock for the testing device being used are dropped back to their initial position, thereby relocking all of the testing mechanisms except the one being used. These various ends are accomplished by providing a coin-chute into which the coin may be dropped and employing a lock-releasing member in the nature of a stop or cover device which substantially or partially covers the end of the chute and retains the coin therein.

A suitable manually-operated plunger is in position to engage the coin after the same has been dropped into the chute, the movement of the plunger crowding the coin against the cover and raising the same.

The lock-releasing member or cover is connected by suitable mechanism to the pawls, whereby the raising of the cover lifts the pawls or releases them from the testing mechanism, thus unlocking the testing mechanism.

The partial completion of any test serves to release the coin from the chute and allow the cover or stop to drop back to its initial position, this movement permitting the pawls to resume their initial position.

One suitable coin-releasing device is illustrated in Figs. 2, 3, and 4, wherein 83 designates the coin-chute into which the coin may be dropped, and 84 the cover or stop which normally lies across the lower end of the coin-chute and serves to stop the coin and prevent its dropping from the end of the chute. The cover 84 is supported by a suitable arm 85, which is hinged to the casing in any usual way, and said cover has projecting therefrom an arm 86, which engages a slot in a coöperating arm 87, fast upon the pawl-releasing rod 81. The rod 81 plays in a suitable guideway 80, secured to the casing in any usual way, and said rod has a projection 73 thereon, which extends under the nose of the pawl 41, as shown in dotted lines, Fig. 4. The coin-chute 83 is provided with a shelf or rest 88, which supports the coin when it engages the cover 84, and 89 represents a manually-controlled plunger which is in a position to engage the coin when supported upon the rest 88.

When it is desired to release the pawl 41, a coin will be deposited into the coin-chute 83, and the plunger 89 will then be pushed inwardly, the said plunger engaging the coin and forcing the same against the cover or lock-releasing member 84 to slightly raise the cover to a position shown in dotted lines, Fig. 4. The two positions of the coin when it is first dropped into the chute and after it has been forced inward by the plunger 89 are also indicated in dotted lines in Fig. 4. The lifting of the cover will through the arms 86 and 87 raise the rod 81 sufficiently to release the pawl 41 from engagement with cross-bar 21, when any one of the testing operations which include the use of the plunger 23 may be performed.

I would here remark that the inward movement of the coin caused by the plunger is not sufficient to force the coin entirely from the shelf or rest 88, though the coin is at this time just at the edge of the shelf, and while in this position the coin is held in its place solely by the weight of the cover 84 and the parts supported thereby, including the rod 81 and pawl.

As stated above, my releasing device is preferably so constructed that all of the pawls will be released simultaneously and by the single upward movement of the rod 81. For this purpose I have shown the pawls 71 as each being loosely mounted on a rock-shaft 77, suitably supported in the casing, and have provided said rock-shaft with arms 78 fast thereto, which arms are connected by a rod 79. The arms and rod form a bail-like device which is situated beneath the pawls 71, as shown. The rock-shaft 77 has another arm 125 fast thereto, which is connected to the lower end of the rod 81, as shown in Fig. 4. From this construction it will be seen that whenever the rod 81 is raised by the means above described not only is the pawl 41 raised, but the rock-shaft 77 is rocked and the bail-like device 78 79 is raised to the dotted-line position, Fig. 4, thus releasing both of the pawls 71 from their respective collars 70. The testing mechanisms are now unlocked, and therefore any particular test desired may be made. As soon, however, as any one individual test has been commenced suitable mechanism is thrown into operation to release the coin and allow the cover 84 to drop back to its initial position, thus permitting the rod 81 and also the various pawls to drop back to their initial position.

The coin-releasing device shown in Figs. 2, 3, and 4 comprises a lifter which is adapted to be engaged by the sector when the sector has been partially rotated and which operates to raise the cover 84 sufficiently to allow the coin to drop from the chute. The arm 86 on the cover is shown as extended in a position to be acted upon by a lifting-bar 91, which has an offset portion at its lower end to engage the arm 86. The said lifting device 91 is connected at its upper end to a rock-arm 92, mounted in any suitable way to turn about a pivot 74 and so as to be engaged at one end by a projection 93 on the rack 9 just after the rack has begun its downward movement. When the projection 93 engages the rock-arm 92, the lifter-bar 91 will be raised and the cover 84 will be opened sufficiently to allow the coin to drop from the chute. Preferably the rock-lever 92 is provided with a pivoted pawl 150, with which the projection 93 coöperates, the said pawl 150 being held in its operative position by a suitable stop 151, as shown. After the projection 93 has engaged the pawl 150 and rocked the arm 92 to thereby raise the cover and release the coin the said projection passes off from the end of the pawl during the further movement of the rack, and the weight of the parts will return said rock-arm to its initial position and allow the rod 81 to assume the full-line position. If the test is being made by means of the plunger 23, it will be obvious that as soon as the test is commenced the arm 21 will move under the pawl 41, and thus hold the pawl elevated; but as soon as the test has been sufficiently commenced to release the coin, as above described, the pawl 41 is in a position to automatically drop back to the full-line position, Fig. 4, as soon as the spring returns the plunger to its initial position. If the test, on the other hand, is being made by means of the gripping or pull-testing device, it will be equally obvious that as soon as the test has been commenced the collar 70 on the particular testing mechanism will be drawn under the pawl to sustain the pawl coöperating therewith. As soon, therefore, as the coin has been released in the manner above described, the pawl 41 will be allowed to drop back into position to lock the plunger, and the pawl 71, coöperating with the idle testing devices, will also resume its initial position, while the other pawl 71 is in position to automatically lock the testing mechanism being used as soon as the test has been completed. A suitable chute (not shown) will serve to convey the coins to a box in the base of the casing.

Figs. 10 to 13 illustrate a slightly-modified coin-releasing device which accomplishes the same purpose as that above described. In these figures only sufficient of the mechanism is shown to illustrate clearly the operation of the device. The cover or lock-releasing member 84 for the coin-chute 83 is carried by a hinged arm 85, as previously described, and said cover has projecting therefrom a pin 86', one end of which engages an arm 180, pivoted at 181 to the casing in any suitable way. The free end of the arm has connected therewith two flexible connections $81^a$ $81^b$, one of said flexible connections being operatively connected to the end of the pawl 41 and the other of said connections being connected to the rock-arm 125 on the shaft 77, which, it will be remembered, has fast thereto the arms 78, forming with the rod 79 a bail-like device extending under the pawls 71. From this construction it will be apparent that as soon as a coin has been inserted in the chute and the plunger 89 moved inwardly the cover 84 will be raised and through the arm 86' will swing the pivoted arm 180 about its pivot to thereby, through the connections 81ª 81ᵇ, raise or release the pawls. As soon, however, as the coin is released, the cover will drop back to its initial position, and the flexible connections will allow all of the pawls, except that coöperating with the testing mechanism being used, to resume their initial position. In this embodiment of my invention the bottom of the shelf 88 is slotted, as shown in Fig. 13, and a coin-supporting finger 145, pivoted to the casing in any suitable way, normally rests against the bottom of the shelf and serves to close the coin-discharging slot therein. The said finger is shown as being held in its operative position by means of a controller, herein shown as a cam 146, pivoted upon any suitable bracket 147, carried by the casing. The cam has integral therewith a drum 148, around which passes one or more times a flexible connection 150, the other end of said flexible connection being wound around and secured to a suitable drum 151, carried by the arbor 6. When now the arbor 6 is rotated in the direction of the arrow, Fig. 10, by means of the rack 9, as hereinbefore explained, the flexible connection 150 will be wound upon the drum 151 and unwound from the drum 148, thereby carrying the cam 146 out from under the arm or finger 145, as illustrated in Fig. 13. The arm 145 will now drop by gravity, thus opening the slot in the bottom of the shelf 88 and allowing the coin to drop therefrom. Since the coin after it has been pushed inward by the plunger supports the weight of the cover 84 and the pawls, the exit of the coin from the chute is almost instantaneous the instant that the controller 146 is removed from its operative position. As soon as the coin is released the pawls will resume their initial position, as already explained.

I have demonstrated that the form of coin-release illustrated in Figs. 10 to 13 is quicker in its action than that illustrated in Figs. 2 to 4, and consequently is better adapted for use when the force of a blow is being tested by means of the plunger, for of necessity this latter test is made in a very short space of time.

From the above description it will be seen that I have employed a single releasing means for all of the pawls, so that whenever the said releasing means is operated all the testing mechanisms will for an instant be released. As soon, however, as any one test has been commenced all the testing mechanisms except that being employed are immediately locked again and can only be released by the insertion of another coin. This is very essential, since it prevents a person from making a series of tests by inserting only a single coin. As soon as the test being made is completed and the testing device has been returned to its normal position by means of the springs the coöperating pawl will serve to lock it in such position.

In addition to the features above described I have employed a signal which indicates when a predetermined amount of expended force has been registered. This signal is shown in the form of a bell 100 on the interior of the head 4, with which a pivoted hammer 101 coöperates. The hammer 101 has an arm 102, which is adapted to be engaged by an adjustable projection 103, carried by the sector, the said projection as it passes the arm 102 turning the hammer 101 and allowing it to fall back upon and strike the bell. The projection 103 is shown as pivoted to the sector 9, so that when the sector returns from the dotted-line to the full-line position the said projection will pass the arm 102 without operating the same. When, however, the sector is being moved in the opposite direction, the projection 103 engages a suitable stop 104 and is thus held in operative position.

I have herein shown and may employ, if desired, in addition to the features above enumerated, a fortune-telling device which operates in conjunction with the registering mechanism to tell the fortune of the person making the test. For this purpose the dial 5 will be arbitrarily marked to indicate various fortunes, as at 111, and the arbor 6 will have thereon a suitable fortune-telling pointer 107, which of course rotates with the arbor, the said fortune-telling pointer passing over the arbitrarily-marked sections on the dial. When any test has been made, the pointer 7 will indicate the number of pounds expended in making the test and the pointer 107 will indicate the fortune of the person.

While I have herein illustrated the best form of my invention now known to me, it will be obvious that various changes may be made in the construction of the device without in any way departing from the spirit of the invention as expressed in the appended claims.

Having described my invention, what I claim as new, and desire to secure by Letters Patent, is—

1. In a strength-testing apparatus, mechanism to test the strength of a blow, and grip-testing mechanism, a single registering mechanism connected to each of said testing mechanisms, a lock for each of said testing mechanisms, lock-releasing mechanism common to both said locks, and means whereby when either test has been commenced the lock for the other test is returned to its locking position.

2. In a strength-testing apparatus, mechanism to test the strength of a blow, pull-testing mechanism and grip-testing mechanism, a single registering mechanism connected to each of said testing mechanisms, a lock for each of said testing mechanisms, lock-releasing means common to all of said locks, said means including a coin-chute, means acting normally to retain the coin in operative position in the chute, and means to release the coin as soon as any one test has been commenced whereby all the locks except the one for the testing mechanism in operation are returned to their locking position.

3. In a strength-testing device, a registering mechanism, a plunger having an exposed head adapted to receive a blow, a predetermined resistance opposing the movement of the plunger in one direction, a plurality of fixed handholds, combined with a grip-testing mechanism and a pull-testing mechanism, operative connections between the registering mechanism and each of the testing mechanisms, a lock for each of said testing mechanisms, a releasing device common to all of the locks, said releasing device including a coin-chute, a movable member adapted to be engaged by the coin and operating to release the locks, and means to release the coin when any one test has been commenced whereby all of the locks except the one for the testing mechanism in operation will return to their locking position.

4. In a strength-testing apparatus, a plurality of independent testing mechanisms, a locking device for each of said testing mechanisms, and a releasing means common to all of said locking devices, and means whereby when any one test has been commenced the locks for the other testing mechanism are returned to their locking position.

5. In a strength-testing apparatus, a plurality of independent testing mechanisms, a lock for each of said testing mechanisms, a coin-controlled releasing means common to all of said locking devices, and means whereby when any one test has been commenced the locks for the other testing mechanisms are returned to their normal position.

6. In a strength-testing apparatus, a plurality of independent testing mechanisms adapted respectively to test the force of a blow and the force of a grip, a registering mechanism common to all said testing mechanisms, independent locking devices for each of said testing mechanisms, coin-controlled releasing means common to all said locking devices, and means actuated by the registering mechanism when the latter begins to record the force expended in making any individual test, and operating to return all of the locking devices except that controlling the testing mechanism being operated to their operative position.

7. In a strength-testing apparatus, a plurality of independent testing mechanisms, a locking-pawl serving normally to lock each testing mechanism, a coin-controlled releasing mechanism common to all of said pawls, and means whereby as any one test is commenced the pawls for the other testing mechanisms are returned to their normal or operative position, the construction being such that but one test can be made by the insertion of a single coin.

8. In a strength-testing apparatus, a registering mechanism, a plunger having an exposed head, an arm on the inner end of the plunger, a pull-testing mechanism independent from the plunger, a flexible connection between the registering mechanism and the pull-testing mechanism, said flexible connection passing loosely through the arm on the plunger and a button on said flexible connection engaging the back side of the arm, whereby the flexible connection may be operated either by the plunger or the pull-testing mechanism independently, independent locks for the plunger and pull-testing mechanism, coin-controlled releasing means common to all of said locks, and means whereby when one test has been commenced the locks for the other testing mechanism are returned to their normal position.

9. In a strength-testing device, a plurality of independent testing mechanisms, a registering mechanism common to all said testing mechanisms, a coin-controlled manually-operated releasing device for all of the pawls, and means actuated by the registering mechanism when it has begun to record the force expended in making any individual test to restore the releasing means to its initial position, whereby all the pawls except that controlling the testing mechanism in use are returned to their normal position.

10. In a strength-testing apparatus, a plurality of independent testing mechanisms, a registering mechanism common to all said testing mechanisms, a locking-pawl for each of said testing mechanisms, a releasing device common to all said pawls, a coin-chute, a manually-operated plunger adapted to engage a coin in the chute and force the same against the releasing device to release the pawls, and means operated by the registering mechanism as it begins to record any test to release the coin and allow the releasing device and pawls to resume their normal position.

11. In a strength-testing mechanism, a plurality of testing devices for making different tests, a registering mechanism common to all said testing devices, a locking-pawl for each of said testing mechanisms, a coin-chute, a movable stop to engage the coin connections between said stop and all the pawls, a manually-operated plunger adapted to engage the coin when against the stop, manual operation of the plunger partially removing the stop and releasing all the pawls, and means actuated by the registering mechanism as it begins to record any individual test to momentarily remove the stop from the path of the coin and allow the coin to drop, the said stop and all the pawls but the one controlling the testing mechanism in use resuming their initial position after the coin is dropped.

12. In an apparatus of the class described, a testing mechanism, a registering mechanism, a lock for the testing mechanism, a releasing device for said lock including a coin-chute having a coin-discharging slot, a movable coin-retaining member normally closing said slot, means governed by the registering mechanism to control the position of said movable member, whereby when said registering mechanism begins to record a test said movable member is removed from the path of the coin and the coin is allowed to be discharged.

13. In an apparatus of the class described, a registering mechanism, a testing mechanism, a lock therefor, a releasing device for said lock, said releasing device including a coin-chute having a coin-discharging slot, a finger normally closing said slot, a controller therefor, connections between said controller and registering mechanism whereby when the registering mechanism begins to record a test the controller allows the finger to open the slot for the discharge of the coin.

14. In a strength-testing apparatus, testing mechanism, a lock therefor, a coin-chute, a movable lock-releasing member in the path of the coin, means to positively place the coin into position to move the lock-releasing members to release the locks, and means to retain said coin in such position until the test has been commenced, and automatic means to release the coin upon the commencement of the test and before the test is completed.

15. In an apparatus of the class described, testing mechanism, a coin-controlled lock therefor, including a coin-chute, means to positively place a coin in operative position in said chute, means to retain the coin in such position until the test has been commenced, and means to release the coin upon the commencement of the test and before the test has been completed.

16. In a strength-testing apparatus, a registering mechanism, a testing mechanism, a coin-controlled lock therefor including a coin-chute, a movable lock-releasing member normally in the path of the coin, means to positively force the coin against said member to move the same sufficiently to release the lock, means to retain the coin in such position, and means operated by the registering mechanism to release the coin before the test has been completed.

17. In a strength-testing apparatus, testing mechanism, a coin-controlled lock therefor, including a coin-chute, a movable lock-lifting member normally in the path of the coin, means to positively force the coin against said member to move the latter sufficiently to release the lock, means to retain the coin in such position until the test has been commenced, and means to release the coin before the test has been completed.

In testimony whereof I have signed my name to this specification in the presence of two subscribing witnesses.

JOHN MAITLAND.

Witnesses:
ARTHUR H. DANFORTH,
OAKMAN A. WEBBER.